Sept. 15, 1959
S. R. OVSHINSKY
2,904,741
MAGNETIC RECTIFIER
Filed March 6, 1957
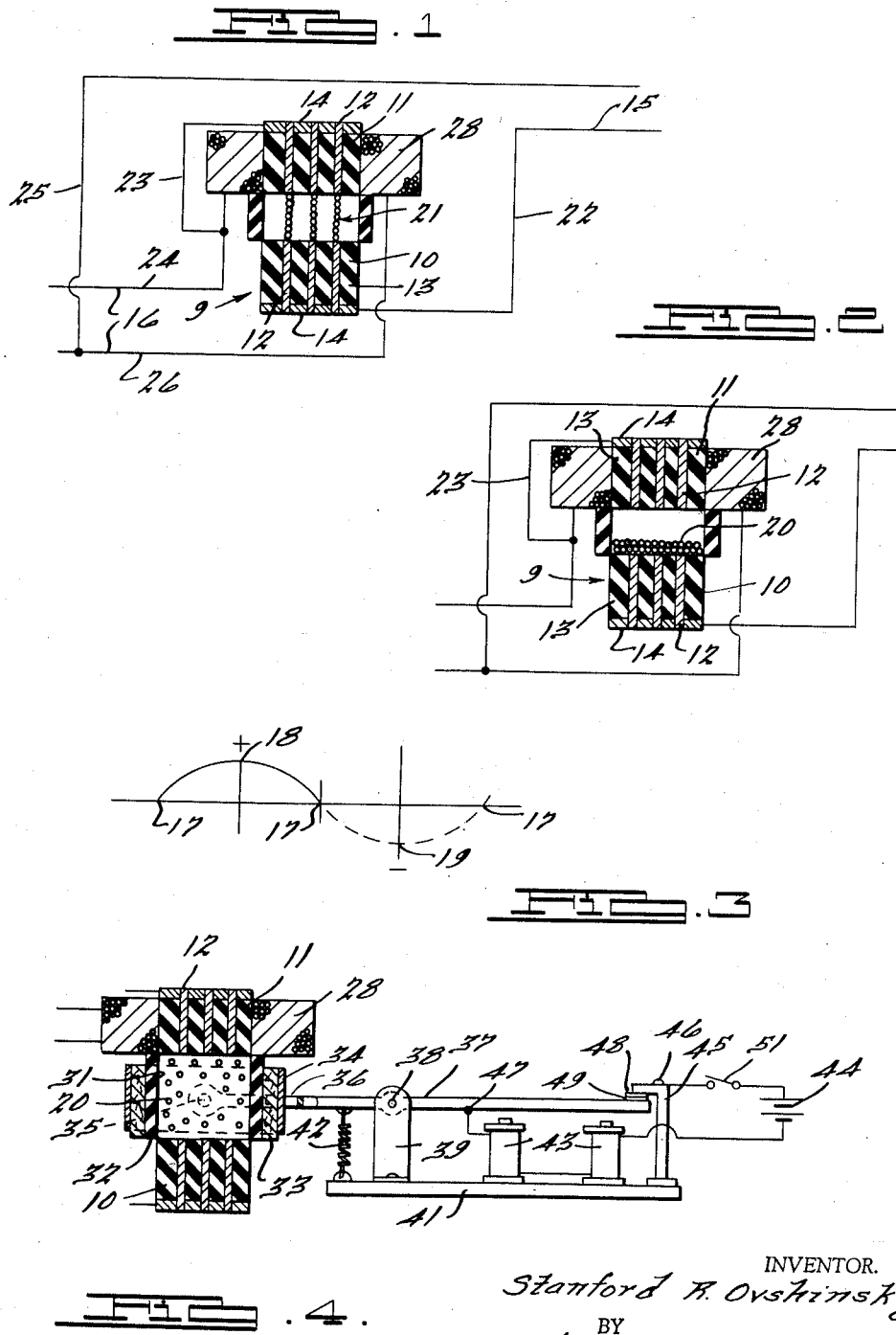
INVENTOR.
Stanford R. Ovshinsky
BY
Harness, Dickey & Pierce
ATTORNEYS.

United States Patent Office 2,904,741
Patented Sept. 15, 1959

2,904,741

MAGNETIC RECTIFIER

Stanford R. Ovshinsky, Detroit, Mich., assignor to Tann Corporation, Detroit, Mich., a corporation of Michigan Application March 6, 1957, Serial No. 644,393

9 Claims. (Cl. 321—48)

This invention relates to rectifying devices for alternating current, and particularly to a rectifying device of the magnetizable type which forms conductive chains during the passage of alternating current in one portion of the cycle and which breaks the chains during the passage of current in the other portion of the cycle.

The present invention takes advantage of the magnetic effect produced by the energization of a coil in one direction to produce attractive flux paths from a plurality of magnetizable balls which are formed into conducting chains which thereby complete a circuit and permit the passage of current during one-half of the alternating cycle sine wave and which produces repellent flux paths upon the passage of the current in the other half of the sine wave which breaks the chains and prevents the passage of a reverse flow of current. The rectifier is preferably made from two like or similar grids having a nonmagnetizable bodies containing a plurality of elongated conducting elements which have their ends parallel and spaced apart to form a cavity in which a plurality of magnetizable balls are retained. The ends of one or both grids may be in nonparallel relation and may take any form to predetermine the lengths of the plurality of flux paths and to control the formation of the conducting chains in a desired order until the desired number of chains are formed relative to the amount of magnetic flux employed. The opposite ends of the elements are conductively joined so that the device can be placed in a circuit through which current will flow when conducting chains are formed by the balls within the cavity. A coil is placed about one of the grids and energized from the circuit which causes the conducting elements of the grid to have one magnetic polarity during the flow of current to the coil during one-half of the sine wave of the alternating cycle and which reverses the magnetic polarity thereof during the other half of the sine wave cycle. During the flow of current during one half cycle, conducting chains will be formed, causing the current to flow in the circuit. Upon the reversal of current during the next half cycle, the chains are broken and the flow of current interrupted. As a result, pulsations of current of the same sense will be delivered to the circuit which can be said to be a pulsating D.C. current. A full wave rectifier is obtained when employing one or more additional rectifying devices timed with each other to deliver current in the same sense but alternatingly, to thereby provide a constant flow of D.C. current.

It is one object of the invention to use a material for the metal elements of the grids and for the balls which has the strains released therefrom by proper annealing so that the material will become magnetically saturated with the lowest amount of applied energy and which will become demagnetized in the shortest amount of time after the applied energy is cut off. The elements and balls have substantially no residual properties and upon a change in applied energy, such as to remove the force for retaining the balls in conducting chains, they will immediately separate and fall to the bottom of the cavity by gravity. Where the flux is reversed or the balls have like charges thereon, in addition to the gravity a repellent force will assure the rapid disintegration of the chains.

Another object of the invention is to so construct the grid, balls and coil as to have the device respond to a predetermined frequency of A.C. or D.C. pulsating current of predetermined strength and length of pulse so that it will respond to certain frequency and to the same type of pulses to function as a memory device to make and break chains.

Other objects of the invention are: to provide a rectifying device which passes current only during one-half of the sine wave of the alternating current supply; to produce the flow of current during the one half cycle of current flow by changing the polarity of magnetizable elements to make and break conducting chains alternatingly each half cycle which permits current to pass only during the one half cycle when the chains are made; to employ a plurality of the devices which are out of phase with each other for delivering current in the same sense seriatim to produce a continuous flow of direct current, and, in general, to provide a rectifying device which is simple in construction, positive in operation and which is substantially indestructible.

Other objects and features of novelty of the invention will be specifically pointed out or will become apparent when referring, for a better understanding of the invention, to the following description taken in conjunction with the accompanying drawing, wherein:

Figure 1 is a sectional view of a rectifying device employed in a circuit and embodying features of the present invention;

Fig. 2 is a view of the structure illustrated in Fig. 1, showing the circuit interrupted;

Fig. 3 is a view of a sine wave to illustrate the flow of current in the circuit and the portion thereof utilized to obtain a direct current flow; and Fig. 4 is a view of structure, similar to that illustrated in Fig. 1, showing a further form of the invention.

In the copending application of S. R. Ovshinsky, Serial No. 645,260, filed March 11, 1957, for Magnetic Relay, devices are illustrated, described and claimed which open and close a circuit carrying a large amount of current controlled by a small amount of current. In the present invention, a similar device 9 is illustrated employed as a rectifier when utilizing a grid 10 which is spaced from a similar grid 11. Each of said grids 10 and 11 have spaced elements 12 of magnetic or magnetizable material dispersed within insulating material 13 which forms the body of the grid. The elements are conductively joined at opposite ends by plates 14 which are connected in a circuit 15 which is to supply D.C. current to a load. The grid 11 has a coil 28 disposed thereabout for the purpose of changing the polarity of the elements 12 of the grid 11 each cycle of an A.C. current which is supplied to the coil by a source 16. The elements 12 of grid 11 which is to be affected by the associated coil 28 should be constructed preferably from magnetic or magnetizable material, while the material of the element 12 of the grid 10 should be magnetic. The magnetic material of grid 10 should be magnetized in such manner as to be in repellent relation to the elements 12 of grid 11 when the current in the coil reverses in the one half cycle of sine wave for quickly breaking the chains. The cycle of alternating current is illustrated by the sine wave in Fig. 3 as having nodal points 17 at which the current is zero on the zero line of the curve which increases in the opposite sense at 18 and 19 above and below the line. Thus, when the flow of current in the supply source 16 is between the nodal points 17 and 17 above the line at 18, the flow of current may be said to be positive and the coil 28 will be energized in the positive sense to produce an attraction between the ends of the element 12 of the two grids 10 and 11, thereby forming conducting chains 21 to pass current through the circuit 15.

It is mentioned that the grids are made of magnetic or magnetizable material separated from each other by the material of the grid body which is nonmagnetizable. Thus, the grid may be made of ceramic or nonmagnetic stainless steel which will withstand annealing temperatures. Such material provides high precision control since the physical working by insertion of the grid elements after annealing into the apertures of the grid body would change the magnetic characteristics of the element material. A nonmagnetic material which will withstand the heat of annealing has apertures into which the elements are inserted before the annealing operation. Preferably, the material selected is one which has a coefficient of expansion substantially equal to that of the material of the elements so that there will be no strains set up between the materials when a change in temperature occurs. The conducting plates 14 as illustrated may be employed to interconnect the elements, or silver or other conducting material may be built up on the body to connect the elements to a conductor. For example, stainless steel having nonmagnetic qualities has been employed as the body of the grid, the elements 13 being forced into the apertures thereof before the heat-treating process. The body material can also be a ceramic, resin or similar material which magnetically and electrically insulates the elements from each other.

A conductor 22 of the circuit 15 is connected to the plate 14 of the grid 10, while the plate 14 of the grid 11 is connected by a conductor 23 to a conductor 24 of the circuit 16. A conductor 25 of the circuit 15 is connected to the conductor 26 of the circuit 16. Thus, the circuit 15 is connected in parallel to the circuit 16 and is disposed in series with the rectifying device 9 which permits the passage of current therethrough only at the time the chains 21 are made between the grids 10 and 11.

The coil 28 is energized in the negative sense as current from the circuit 16 passes therethrough, as illustrated by the portion 19 of the wave between the nodal points 17 located below the zero line. When the coil 28 is energized in the negative sense, it overcomes the magnetism of the elements 12 of the grid 11 and a force is present between the ends of the elements 12 to break the chains 23, as illustrated in Fig. 2, to prevent a flow of current in a negative sense to the circuit 15. This passage of current through the coil 28 in the negative sense reverses the polarity of the elements 12 of the grid 11 so that the adjacent ends of the elements of the two grids can be said to be of the negative sense and the chains 21 are broken by the repellent effect thereof. No current will pass through the rectifying device 9 and only like impulses, producing a directional flow of current, will be supplied to the conductors 22 and 25 of the circuit 15. Immediately upon the reversal of the direction of flow of current in the circuit 16, the magnetizable effect upon the coil 28 will be reversed and will assist the magnetic field of the elements 12 of the grid 11 so that the adjacent ends of the elements 12 of the two grids 10 and 11 will have an attractive force therebetween, which immediately establishes the chains 21 and produces a flow of current in a positive sense through the circuit 15. This simple device, therefore, is capable of rectifying an A.C. current to a D.C. current by the alternating flow of the A.C. current between a positive and a negative sense. It is to be understood that by employing a plurality of the rectifying devices 9 in proper combination, the impulses may be so superimposed as to obtain a steady flow of rectified current through the circuit 15.

Instead of having the elements 12 permanent magnets, as illustrated herein, a magnetizable material may be employed which is not a permanent magnet but which is magnetized by a separate coil for each of the grids 10 and 11. The grid 10 may have the elements 12 permanent magnets and the elements 12 of the grid 11 magnetizable material, or vice versa, or all of the elements may be permanent magnets. Since the actuation of the device must occur a desirable number of times a second, the material making up the magnetizable elements 12 and the balls must be of a type to have low coercive force and low residual retention. A preferred material, by way of example, would be 50% nickel and 50% iron or variations of these elements properly annealed to require only small coercive forces to reach saturation.

It is within the purview of the invention to employ the rectifying device 9 as a pulse generator. Depending upon the input cycle of the current in the conductors 16, any corresponding pulse can be delivered to the circuit 15. By controlling the materials of the balls 20 and elements 12, preferably by a heat-treating process on the elements 12 or balls 20 or on both, a lag time can be provided which delays the breaking of the chains 21 which thereby accurately controls the number of pulses which can be passed as a maximum through the device. In such an arrangement, the device functions as a filter to control the frequency of the pulsations of the current passing from the device irrespective of the applied frequency. It is to be understood that the balls may be coated with conducting material, such as silver, or the like, to reduce the resistance to current flow through the chains. The coating on the balls or the balls themselves may be of a resistance material which is employed to control the amount of current which passes through the device. This applies both to alternating and direct current pulsations and not only will the device provide indications of a predetermined frequency to respond as a signal, but the device alone or in combination with other devices can function as a memory device in which a signal is only passed when proper frequencies and spacing of the pulsations coincide with each other.

The device, as illustrated in Figs. 1 and 2, depends upon gravity to break the chains and while a material is employed for the balls 20 and elements 12 to have the lowest coercive force and residual effects so that chains may be made and broken substantially instantaneously, the usable frequency, even though comparatively high, may be limited if gravity alone is relied upon to break the chains. To provide a force which operates additionally to or independently of gravity, an electrostatic field is provided in the cavity between the grids which produces like charges on the balls, to thereby produce a repellent force therebetween which is present to interrupt the chains along with or independently of gravity. Such a device is illustrated by way of example in Fig. 4 wherein the grid elements 10 and 11 have a plurality of magnets or magnetizable elements 12 separated by a cavity 31. A coil 28 produces a change in the flux on the elements 12 which changes the polarity or reduces the strength of the elements 12 when permanent magnets, to provide an attractive force in cooperation with the elements of the grid 11, to thereby form chains of the balls 20. To produce an electrostatic field in the space between the grids, the space is surrounded by a sleeve 32 which is of rubber or like material which is chargeable. A sleeve of wool or like material 33 surrounds the sleeve 32 and the outer surface of the material 33 is secured to the inner surface of a band 34. A pair of trunnions 35 is diametrically disposed on the outer side of the sleeve 34 and connected to the ends of a yoke 36 on one end of a bar 37. The bar is supported on a pivot 38 on a bracket 39 which is secured to a base 41. The forward end of the bar 37 is urged downwardly by a spring 42, the opposite or rearward end being moved downwardly by magnetic means embodying a pair of coils 43. The coils are in circuit with a battery 44 connected thereto by a circuit connected to a standard 45 and 46 and to the bar 37 at the point 47. The standard and bar have contacts 48 and 49, respectively, which break the circuit when the magnets are energized when a switch 51 is closed. Upon the energization of the magnets 43, the rear end of the bar 37 is moved downwardly to separate the contacts 49 and to de-energize the magnets, permitting the spring 42 to move the sleeves 33 and 34 downwardly to the position illustrated, with the contacts 48 and 49 again engaged. The operation of the magnet is the same as that well known in the art for operating buzzers and bells, and the continuous rocking of the bar 37 causes the reciprocation of the sleeve 33 on the sleeve 32, thereby producing an electrostatic field within the cavity 31 which produces like charges on the balls 20 which are in repellent relation to each other, as illustrated in the figure. A change in the supply of current to the coil 28 will produce chains from the balls at a predetermined point of energization, and upon further energization more and more chains will be formed with greater pressure between the balls, thereby increasing the amount of current which may be passed through the chains. By the use of the repellent force on the balls, the making and breaking of the chains will occur in a very rapid manner, permitting a very high frequency to be passed through the device, and similarly high frequencies may be sensed by the device due to the repellant force present to break the chains.

Uncoated balls are employed when the resistance thereof controls the amount of current passing, and when a large amount of current is to be passed, the balls may be coated with conducting material, such as silver or the like, to substantially reduce the resistance to the flow of current when the balls are in chain form. Mercury may be employed within the cavity to further increase the conductivity of the balls under certain conditions and to eliminate the possibility of arcs being drawn when the chains are broken.

What is claimed is:

1. In a rectifying device, a pair of grids having insulating bodies in which a plurality of conducting elements are spaced, with the bodies and elements spaced apart to form a cavity therebetween, conducting means on the opposite ends of the bodies joining the remote ends of the conducting elements, a plurality of magnetizable balls within the cavity, and a coil about at least one of said grids for changing the polarity of the elements to make and break conducting chains of said balls corresponding to one or the other half cycle to pass current only during the one half cycle which makes the conducting chains.

2. In a rectifying device, a pair of spaced grids, each grid being made of insulating material having elongated conducting elements spaced apart therein and in aligned relationship across the cavity between the bodies and the elements, the ends of the conducting elements remote from the cavity being conductively joined, a plurality of magnetizable balls within the cavity, and a coil for changing the polarity of the associated conducting elements upon the reversal of the flow of current therein, the flow of current in one direction causing conducting chains to form and in the opposite direction to be broken so that only current in the same half of the sine wave of an alternating current can pass through the device.

3. In a rectifying device, a pair of spaced grids, each grid being made of insulating material having elongated conducting elements spaced apart therein and in aligned relationship across the cavity between the bodies and the elements, the ends of the conducting elements remote from the cavity being conductively joined, a plurality of magnetizable balls within the cavity, a coil for changing the polarity of the associated conducting elements upon the reversal of the flow of current therein, the flow of current in one direction causing conducting chains to form and in the opposite direction to be broken so that only current in the same half of the sine wave of an alternating current can pass through the device, and an additional rectifying device shifted 180° out of phase with the first device to pass a continuous flow of direct current in the circuit.

4. In a rectifying device, a pair of spaced conducting elements, magnetizable balls in the space between said elements, a coil about at least one of said elements, and a circuit across said space in parallel relation to a circuit to said coil whereby current from an alternating current source through the said circuit can pass only when chains are formed across said spaces by one half portions of the sine wave of the current.

5. In a rectifying device, a pair of spaced conducting elements, magnetizable balls in the space between said elements, a coil about one of said elements, a circuit across said space in parallel relation to a circuit to said coil whereby current from an alternating current source through the said circuit can pass only when chains are formed across said spaces by one half portions of the sine wave of the current, and a second like rectifying device having the usable portion of the sine waves out of phase with that of the first said device so that the portions of the wave which passed through the devices will provide a continuous flow of direct current.

6. In a device having a space containing a plurality of magnetizable balls, a coil for applying a magnetic field to said balls for causing conducting chains thereof to be formed in one direction of flow of alternating current but which breaks up the chains in the other direction of flow of the alternating current, and a circuit connected to said coil and a circuit parallel thereto connected across said space whereby the flow of current in one direction will form the conducting chains and pass current through the circuit while the flow of current in the other direction will interrupt the chains and the flow of current so that pulsations of direct current will occur from the flow of alternating current.

7. In a device having a space containing a plurality of magnetizable balls, a coil for applying a magnetic field to said balls for causing conducting chains thereof to be formed in one direction of flow of alternating current but which breaks up the chains in the other direction of flow of the alternating current, a circuit connected to said coil and a circuit parallel thereto connected across said space whereby the flow of current in one direction will form the conducting chains and pass current through the circuit while the flow of current in the other direction will interrupt the chains and the flow of current so that pulsations of direct current will occur from the flow of alternating current, and a like device connected in said circuit having the phase of the sine wave offset 180° to that of the first device to provide a continuous flow of D.C. current from the pulsating flow from the two devices.

8. In a current control device, a pair of grids having nonmagnetic bodies in which a plurality of conducting elements are spaced, with the bodies and elements spaced apart to form a cavity therebetween, conducting means on the opposite ends of the bodies joining the remote ends of the conducting elements, a plurality of magnetizable balls within the cavity, a coil about at least one of said grids for changing the polarity of the elements to make and break conducting chains of said balls, and means for maintaining like charges on said balls the repellent force of which is overcome to form chains.

9. In a current control device, a pair of grids having nonmagnetic bodies in which a plurality of conducting elements are spaced, with the bodies and elements spaced apart to form a cavity therebetween, conducting means on the opposite ends of the bodies joining the remote ends of the conducting elements, a plurality of magnetizable balls within the cavity, a coil about at least one of said grids for changing the polarity of the elements to make and break conducting chains of said balls, means for maintaining like charges on said balls the repellent force of which overcome to form chains, and means varying the force to form a desired number of chains.

References Cited in the file of this patent

UNITED STATES PATENTS

| | | |
|---|---|---|
| 2,015,156 | Richmond | Sept. 24, 1935 |
| 2,500,953 | Libman | Mar. 21, 1950 |
| 2,668,884 | Jacobs | Feb. 9, 1954 |

UNITED STATES PATENT OFFICE
CERTIFICATE OF CORRECTION

Patent No. 2,904,741 September 15, 1959

Stanford R. Ovshinsky

It is hereby certified that error appears in the printed specification of the above numbered patent requiring correction and that the said Letters Patent should read as corrected below.

Column 1, line 31, strike out "a" after "having"; column 5, line 6, for "and", first occurrence, read -- at --; column 7, line 5, after "which" insert -- is --.

Signed and sealed this 29th day of March 1960.

(SEAL)
Attest:

KARL H. AXLINE
Attesting Officer

ROBERT C. WATSON
Commissioner of Patents